United States Patent [19]

Hiramatsu

[11] Patent Number: 5,802,030

[45] Date of Patent: Sep. 1, 1998

[54] INFORMATION REPRODUCING APPARATUS AND METHOD FOR REPRODUCING INFORMATION BY USING A MULTIBEAM SPOT

[75] Inventor: Makoto Hiramatsu, Kawasaki, Japan

[73] Assignee: Canon Kabushiki Kaisha, Tokyo, Japan

[21] Appl. No.: 685,471

[22] Filed: Jul. 24, 1996

[30] Foreign Application Priority Data

Jul. 24, 1995 [JP] Japan .................................. 7-187192
Jul. 23, 1996 [JP] Japan .................................. 8-193519

[51] Int. Cl.$^6$ .................................................. G11B 7/00
[52] U.S. Cl. ........................................... 369/59; 369/48
[58] Field of Search ................................ 369/59, 47, 48, 369/49, 50, 54, 58, 124, 32; 360/48

[56] References Cited

U.S. PATENT DOCUMENTS 5,398,225  3/1995  Sugaya et al. ...................... 369/48
5,506,825  4/1996  Gushima et al. .................. 369/48 X
5,557,602  9/1996  Horimai et al. ................... 369/48 X
5,563,863  10/1996  Hiramatsu ......................... 369/59

*Primary Examiner*—Muhammad N. Edun
*Attorney, Agent, or Firm*—Fitzpatrick, Cella, Harper & Scinto

[57] ABSTRACT

An information reproducing apparatus for simultaneously reproducing information recorded on a recording medium such as a magneto-optical disk through a plurality of information channels by using a multibeam spot of a laser beam includes a circuit for generating a reproduction signal on the basis of a signal detected from one of the information channels and a signal detected from another information channel. The generating circuit includes a light source, a photodetective sensor, a waveform equalizing circuit, and a binarizing circuit provided in correspondence to each information channel and a data separator for generating reproduction data on the basis of an output of each binarizing circuit and a clock signal.

3 Claims, 14 Drawing Sheets

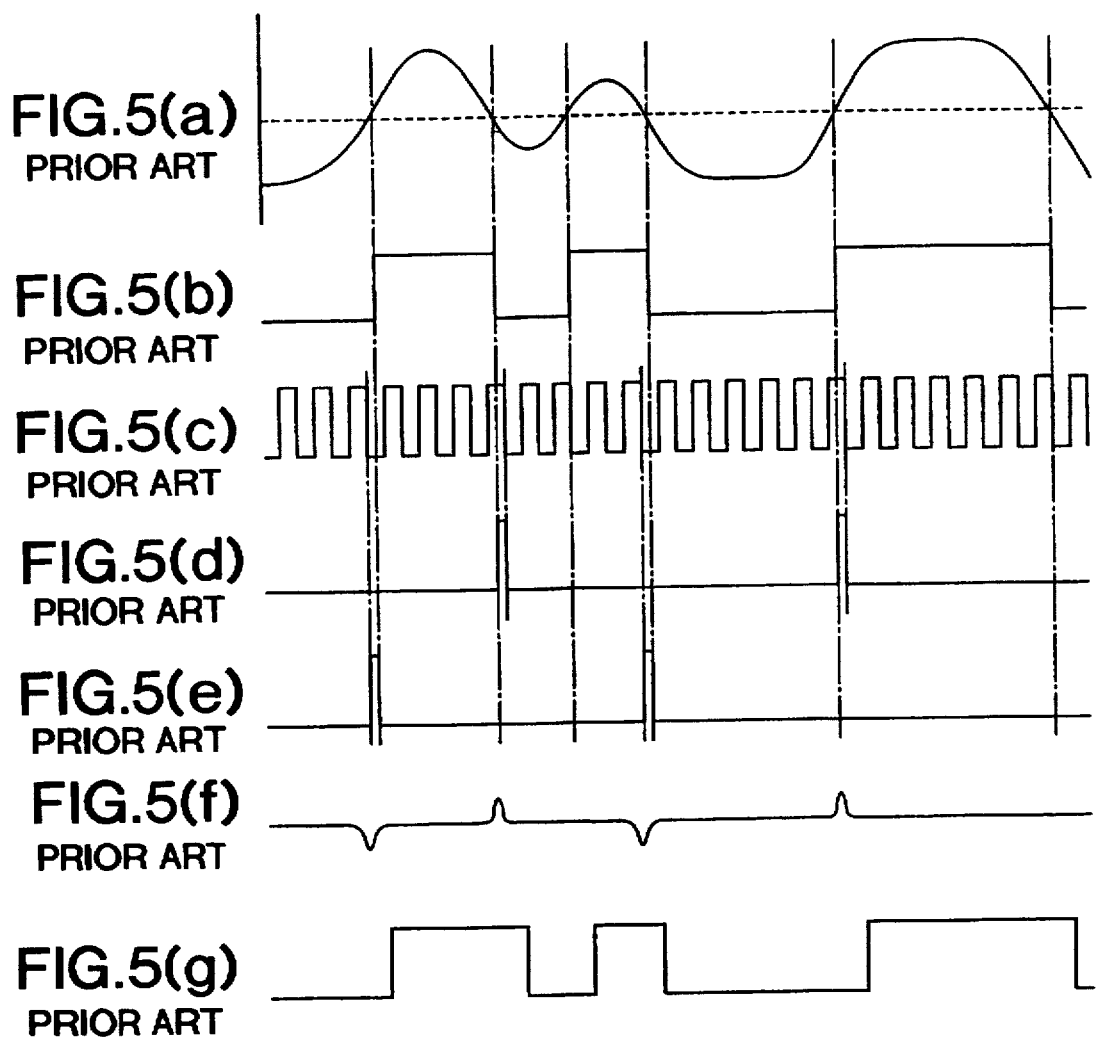
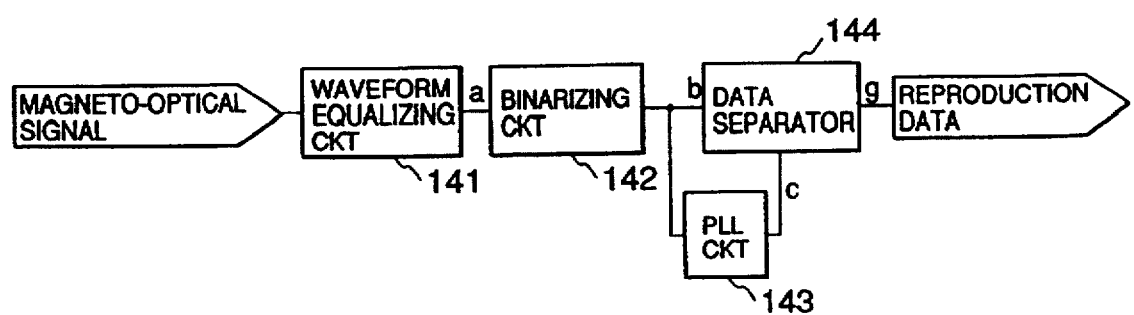

FIG.7
PRIOR ART
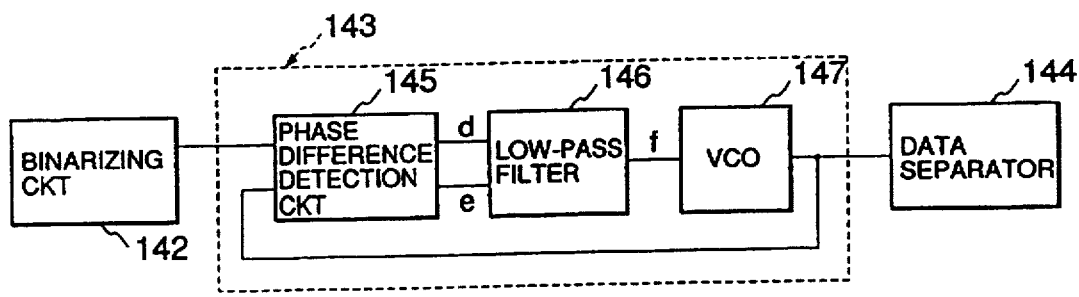
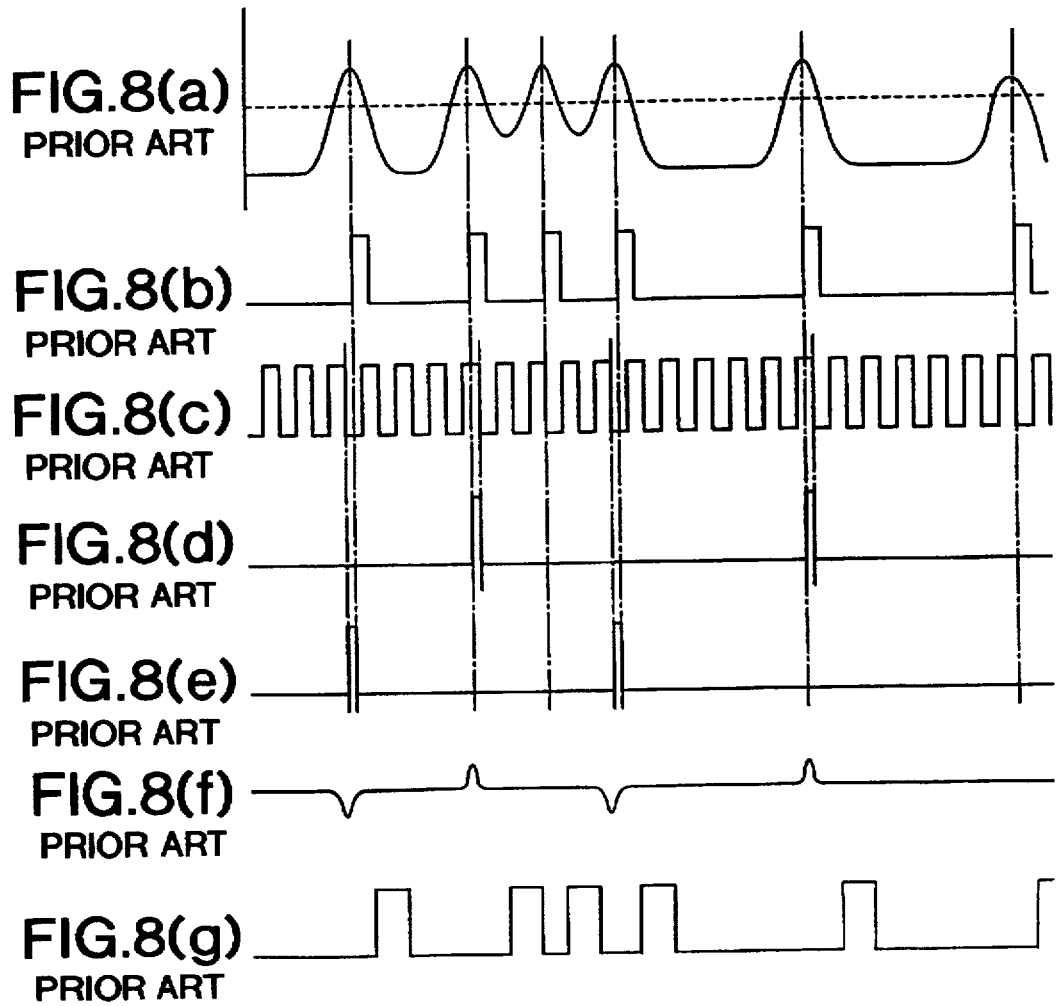
FIG.8(a) PRIOR ART
FIG.8(b) PRIOR ART
FIG.8(c) PRIOR ART
FIG.8(d) PRIOR ART
FIG.8(e) PRIOR ART
FIG.8(f) PRIOR ART
FIG.8(g) PRIOR ART

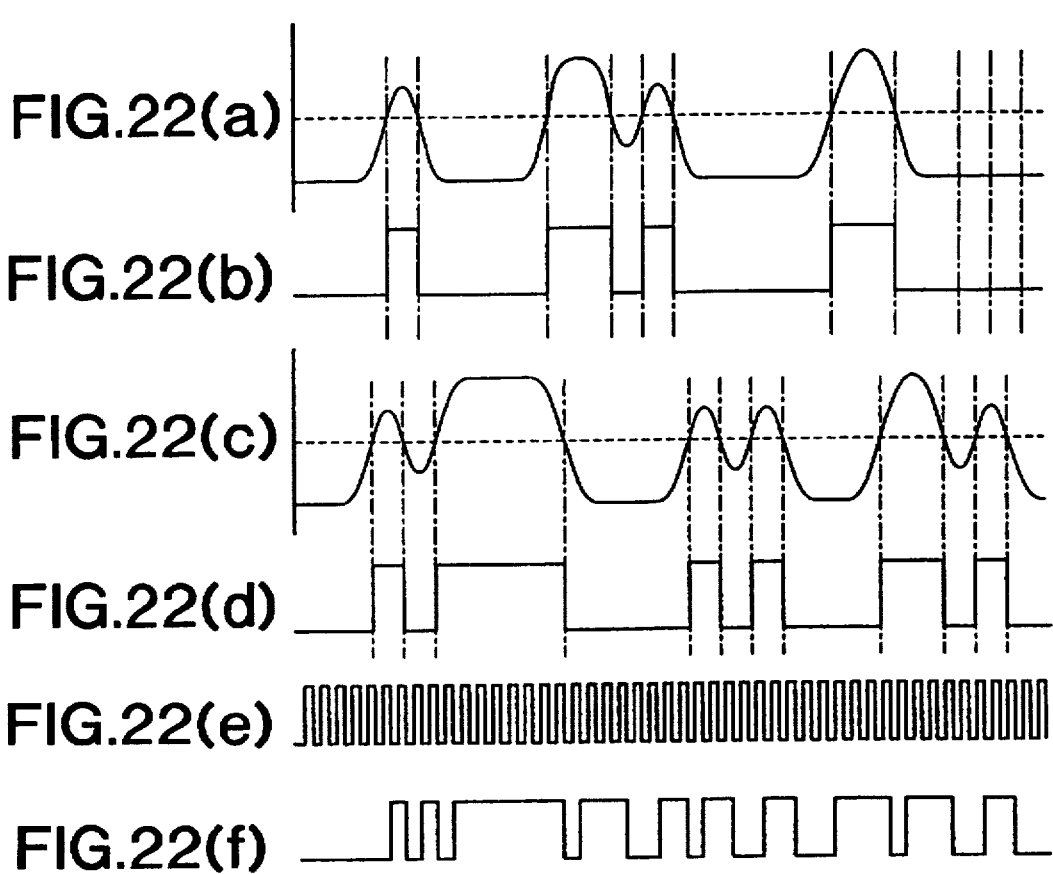

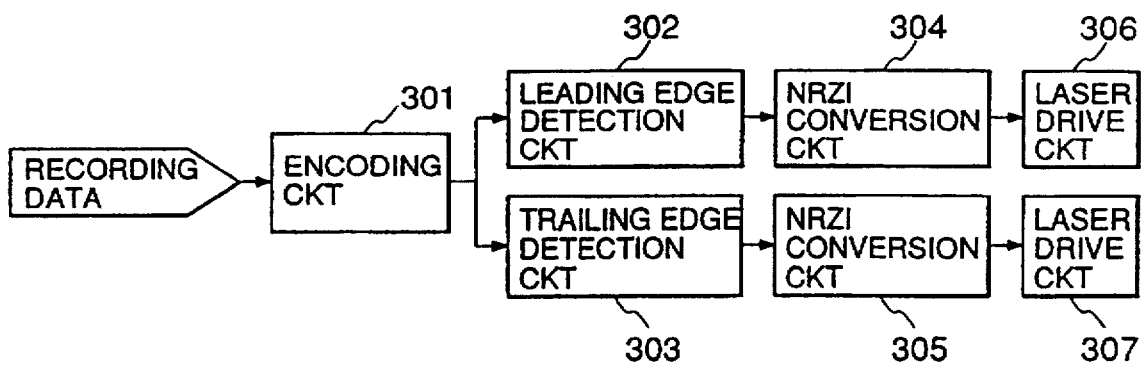

FIG. 25
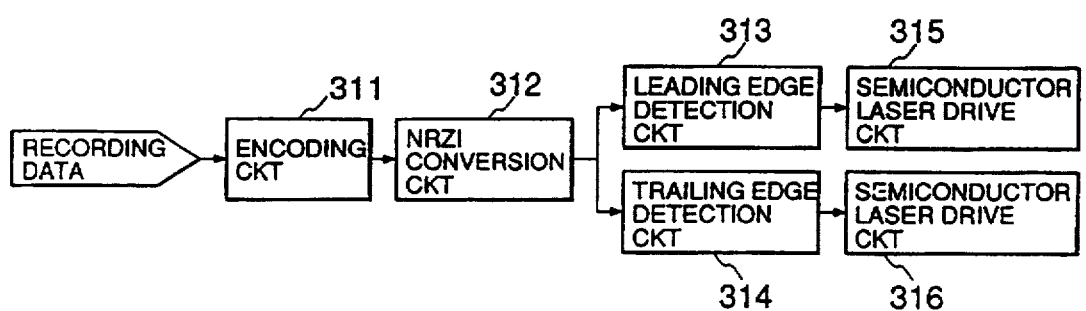
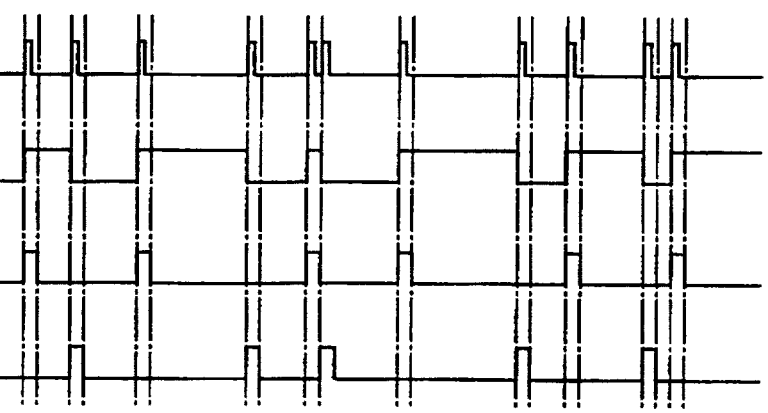
FIG.26(a)
FIG.26(b)
FIG.26(c)
FIG.26(d)

INFORMATION REPRODUCING APPARATUS AND METHOD FOR REPRODUCING INFORMATION BY USING A MULTIBEAM SPOT

BACKGROUND OF THE INVENTION

1. Field of the Invention

The present invention relates to an information reproducing apparatus and a method for reproducing information by using a multibeam spot.

2. Related Background Art

In recent years, it has been advertised that the present day is a multimedia era, in which there are many requests for a variety of information, high density of information, high speed transmission of information, and the like, and various information media and information recording and reproducing apparatuses have been developed every year. Particularly, in the case of an optical disk recording medium in which a random access can be performed, since recording density can be raised, many expectations are achieved. Among those optical disks, attention is paid to a magneto-optical recording disk, a phase change recording disk, or the like in which color still images, motion images, and the like can be stored and which can also treat data of a personal computer as a recording and reproducing medium of a large capacity.

As a modulation system of the magneto-optical recording disk, there are a light modulation system and a magnetic field modulation system. According to the light modulation system, information is recorded by a light intensity modulation. According to the light modulation system, information can be recorded to a front side and a back side of a both-side medium. Information also can be overwritten if an exclusive-use disk having recording films of layers of a number larger than that of the ordinary disk is used.

According to the magnetic field modulation system, on the other hand, a laser beam is continuously irradiated and a magnetic field of a magnetic head is inverted in a form near a rectangular wave during the irradiation. According to such a system, since it is necessary to raise a recording frequency in a state in which a current that is supplied to a coil for applying a magnetic field is set to a form near a rectangular wave, it is difficult to record data at a high speed.

Although electric power consumption is large, such a system is generally called a simple magnetic field modulation system and is used in what is called a mini disc player.

According to a laser pulse magnetic field modulation system as an improved system of such a modulation system, information is recorded by a magnetic field direction when a region heated by irradiating a pulse-shaped laser beam at regular intervals is cooled.

According to the laser pulse magnetic field modulation system, when recording, the laser beam is irradiated in a pulse shape at regular intervals and the direction of the magnetization of only a spot to which the laser beam has been irradiated is reversed as a recording mark. Therefore, as compared with the general magnetic field modulation system in which a shape of a recording mark is determined by a waveform of a current which inverts the magnetic field, an edge of the recording mark is sharp. Such a laser pulse magnetic field modulation system is suitable for mark edge recording such that information is recorded at an edge position of the recording mark and is also expected as an application to a digital video disc (DVD).

As one kind of such a magneto-optical recording and reproducing apparatus, there is an apparatus with a construction as shown in FIG. 1. In the diagram, a laser beam emitted from a semiconductor laser 101 is converted into a parallel light beam by a collimator lens 102 and is focused onto a recording medium 105 through a beam splitter 103 and an objective lens 104, thereby forming a beam spot.

FIG. 2 shows a state near the beam spot on the recording medium 105. An information domain 122 is detected by a beam spot 121, thereby reproducing information. The information domain 122 shown in the diagram shows an example of the mark edge recording in which recording signals are made to correspond to both edges of the information domain 122. It is known that a recording density can be raised about 1.5 times as compared with that of a mark position recording, which will be explained hereinafter. A reproducing process will be explained later. By a servo control apparatus, the beam spot 121 is positioned onto a land 123 between grooves formed on the recording medium by a focusing servo and a tracking servo.

Returning to FIG. 1, the construction of FIG. 1 will now be explained. When information is recorded, an output light amount of the semiconductor laser 101 is increased, a temperature of a portion on the recording medium 105 to which the laser spot is positioned is locally elevated, and a recording magnetic field is applied by a bias magnet 106, thereby forming the information domain 122 and recording the information. In this instance, while a magnetic field is applied to the bias magnet 106, an output light amount of the laser is set to low and high levels by, for example, binary information "0" and "1" and the laser spot is supplied. When a temperature of a laser spot point to which the laser beam was irradiated rises to a temperature near the Curie point, the magnetization is inverted. When erasing, the direction of the bias magnetic field applied by the bias magnet 106 is reversed, the laser beam is continuously irradiated, and the magnetizing direction is aligned to a predetermined direction. In this case, there is an example such that the disk is rotated twice for one writing operation to write information after the information which had previously been written was erased. There is also an example of an overwrite such that both of the erasure and the writing operations are simultaneously finished by one rotation.

When information is reproduced, the output light amount of the semiconductor laser 101 is set to be small, thereby preventing that the temperature of the portion on the recording medium 105 to which the laser spot is located is largely raised. On the recording medium 105, a reflected light whose plane of polarization has been rotated in accordance with the recording information by a Kerr effect again reaches the beam splitter 103 through the objective lens. The reflected light is separated from incident light and a part of the light beam is guided to a servo sensor 108 through the collimator lens 102 by a beam splitter 107. An output of the servo sensor 108 is inputted to a servo control circuit 109. In accordance with an output of the servo control circuit 109, a focusing servo control, a tracking servo control, a tilt servo control, and the like are executed, so that the beam spot is positioned to the desired land 123 on the recording medium.

After the plane of polarization was rotated by a λ/2 plate 110, the remaining light beam is separated into two light beams by a beam splitter 111 and is received by RF sensors 112 and 113. Current outputs of the RF sensors 112 and 113 are converted into voltages by preamplifiers 114 and 115. A difference between the voltages is obtained by a differential amplifier 116. An output of the differential amplifier 116 will be called a "magneto-optical signal" hereinafter. The magneto-optical signal obtained is inputted to data reproducing means 117 and recorded data is detected. The outputs from the preamplifiers 114 and 115 are inputted to an adding amplifier 118 and are added, thereby detecting a signal due to a change in reflected light amount. Such a signal is called a "sum signal" hereinafter and is used in, for example, a control of a tracking servo control system.

FIG. 3 shows a construction of the data reproducing means 117. The differential magneto-optical signal is inputted to a waveform equalizing circuit 131 and a waveform in shaped. A resultant output is shown in FIG. 5(a). This output signal is supplied to a binarizing circuit 132 and is compared with a predetermined slice level, thereby binarizing and obtaining a waveform as shown in FIG. 5(b). Such a binary signal is supplied to a PLL circuit 133, thereby obtaining a clock as shown in FIG. 5(c). The clock is supplied to a data separator 134. By detecting data by a sampling clock, reproduction data shown in FIG. 5(g) is derived.

FIG. 4 shows a construction of the PLL circuit 133 in this instance. A deviation between the phases of the output signal from the binarizing circuit 132 shown in FIG. 5(b) and the clock shown in FIG. 5(c) is detected by a phase difference detection circuit 135, thereby obtaining, for example, a phase delay pulse signal shown in FIG. 5(d) and a phase advance pulse signal shown in FIG. 5(e). Those pulse signals are supplied to a low-pass filter 136, thereby obtaining a voltage value corresponding to a deviation of the phase shown in FIG. 5(f). This voltage signal is supplied to a VCO (Voltage Controlled Oscillator) 137 and an oscillating frequency is controlled, thereby obtaining a sync clock synchronized with the output signal from the binarizing circuit 132.

In this example, a (1, 7) RLL (Run Length Limited) code is used as a recording code of the recording modulation system. There are a minimum inversion time (d) and a maximum inversion time (k) as elements to decide a performance of the recording code.

In this construction, when using an optical system in which a laser wavelength is set to 780 nm and a numerical aperture NA of an objective lens is set to 0.55, a shortest mark length can be set to about 0.80 μm. In this case, a recording density of 0.60 μm/bit can be accomplished. In this instance, now assuming that a linear velocity of the disk is set to 15.0 m/sec, a transfer rate of 3.13 bytes/sec can be obtained.

In the case of the example shown here, as a pit recording method, a mark edge system of a PWM modulation and demodulation system in which a width of the pulse of the output signal of the binarizing circuit changes is used. In such a case, an edge of the pulse of the magneto-optical signal, namely, an edge of the information domain is used as an information mark.

Subsequently, a construction of a pit position (or called a "mark position") recording system is utilized in which the recording signal is made to correspond to the center of the recorded information domain. Since a difference with the foregoing example relates to only data reproducing means, a construction after the data reproducing means will be described.

FIG. 6 shows a construction of the data reproducing means. The magneto-optical signal is inputted to a waveform equalizing circuit 141, thereby shaping a waveform. A resultant output is shown in FIG. 8(a). This output signal is supplied to a binarizing circuit 142 and is binarized by detecting a position of an information domain, thereby obtaining a waveform as shown in FIG. 8(b). This signal is inputted to a PLL circuit 143, thereby obtaining a clock as shown in FIG. 8(c). The clock is supplied to a data separator 144. By detecting the data by the clock, reproduction data shown in FIG. 8(g) is derived.

FIG. 7 shows a construction of the PLL circuit in this instance. A deviation between the phases of the output signal from the binarizing circuit shown in FIG. 8(b) and the clock shown in FIG. 8(c) is detected by a phase difference detection circuit 145, thereby obtaining a phase delay pulse signal shown in FIG. 8(d) and a phase advance pulse signal shown in FIG. 8(e). Those pulse signals are inputted to a low pass filter 146 and a voltage value corresponding to a deviation of the phase shown in FIG. 8(f) is obtained. Such a voltage signal is supplied to a VCO (Voltage Controlled Oscillator) 147 and an oscillating frequency is controlled, thereby obtaining a sync clock of FIG. 8(c).

In the above construction, when using an optical system in which a laser wavelength is set to 780 nm and a numerical aperture NA of an objective lens is set to 0.55, a shortest mark length can be set to about 0.67 μm. In this case, a recording density of 1.00 μm/bit can be accomplished. In this instance, now assuming that a linear velocity of the disk is set to 15.0 m/sec, a transfer rate of 1.88 bytes/sec can be obtained.

The reproduction data detecting means of a self clock system such that a sync clock is extracted from the reproduction signal from the binarizing circuit has been mentioned above. A method of extracting the sync clock signal from a mark which has previously been recorded on a recording medium is also considered as a detecting method of the sync clock signal. A construction of such an extracting method will now be described hereinafter.

The whole apparatus has a construction similar to that shown in FIG. 1. FIG. 9 shows a schematic diagram on the recording medium surface. In the diagram, portions similar to those in FIG. 2 are designated by the same reference numerals and their descriptions are omitted. A tracking servo and the extraction of a sync clock are executed by a reproduction signal from a mark 155 which has previously been recorded on the recording medium surface. In this instance, generally, a mark accompanied with a fluctuation of a reflectance due to a recess, projection or the like on the recording medium surface is generally used as a mark which has previously been recorded. Therefore, a sum signal which is derived from an output of the adding amplifier 118 shown in FIG. 1 is used as a reproduction signal.

FIG. 10 shows a construction of the data reproducing means. The magneto-optical signal is inputted to a waveform equalizing circuit 111, thereby shaping a waveform. A resultant output is shown in FIG. 11(a). This output signal is supplied to a binarizing circuit 152 and is compared with a predetermined slice level, thereby binarizing and obtaining a waveform as shown in FIG. 11(b). Such a binary signal is supplied to a data separator 154 and a clock signal synchronized with the sum signal is formed from the signal by a PLL circuit 153. Data is detected by the extracted sync clock shown in FIG. 11(c), thereby obtaining reproduction data shown in FIG. 11(d).

In the construction, when using an optical system in which a laser wavelength is set to 780 nm and a numerical aperture NA of an objective lens is set to 0.55, a shortest mark length can be set to about 0.44 μm. In this case, if a 8/11 code (one byte is converted into 11 channel bits and recording pits are formed at a total of four positions of two odd number designated positions and two even number designated positions) is used as a code, a recording density of 0.60 μm/bit can be accomplished. In this instance, now assuming that a linear velocity of the disk is set to 15.0 m/sec, a transfer rate of 3.13 bytes/sec can be obtained.

Hitherto, the magneto-optical recording and reproducing apparatus records and reproduces information by the mark edge system or mark position system as described above or by the mark construction shown in the example using the read only PLL circuit.

Generally, when the size of an information domain which is recorded on the magneto-optical recording medium is made small, a quality of an amplitude, a phase, or the like of a reproduction data signal deteriorates and an error rate upon reproducing information increases. Therefore, a size of an information domain which can be recorded is preliminarily determined in dependence on the magneto-optical recording medium. Although the transfer rate of the information depends on a rotational speed and a moving speed of the recording medium for the position of a beam spot, such a transfer rate cannot be set to a large value because of a limitation from a position control of the beam spot or the like.

In the conventional apparatus, the minimum value and the maximum value of intervals between two continuous information marks which are detected from the beam spot are specified, thereby deciding the improvement of the recording density and the easiness of the extraction of the sync clock. Particularly, with regard to the minimum value of the intervals of the information marks, the recording density is determined by how many periods of the sync clocks are allocated to such an interval. That is, the recording density is determined by to which extent the interval of the information marks can be decreased.

Therefore, since the size of an information domain cannot be reduced to a certain size in the foregoing conventional apparatus, namely, since the interval of the information marks cannot be reduced, there is a problem such that it is difficult to raise the recording density and transfer rate of information.

SUMMARY OF THE INVENTION

The present invention is made in consideration of the above problems and it is an object to provide an information reproducing apparatus for simultaneously reproducing information recorded on a recording medium through a plurality of information channels, wherein the apparatus includes means for generating a reproduction signal on the basis of a signal detected from one of the information channels and a signal detected from another information channel.

Further, the above object is accomplished by the above apparatus in which the generating means comprises: a light source, a photodetective sensor, a waveform equalizing circuit, and a binarizing circuit which are provided in correspondence to the information channels; and a data separator for generating reproduction data on the basis of each output of the binarizing circuit and a clock signal.

Further, the above object is accomplished by the above apparatus, in which an interval between the information mark detected from, one of the information channels and the information mark detected subsequently from another information channel is set to a value which is equal to or larger than a predetermined value and is equal to or less than a predetermined value.

Further, the above object is accomplished by an information reproducing method of simultaneously reproducing information recorded on a recording medium through a plurality of information channels, wherein the method includes a step of generating a reproduction signal on the basis of a signal detected from one of the information channels and a signal detected from another information channel.

The "information channel" denotes, for example, an information track, and the wording "is equal to or larger than a predetermined value" and "is equal to or less than a predetermined value" correspond to the minimum inversion time (d) and the maximum inversion time (k) of the recording code, respectively.

For example, in the invention, in the mark edge recording system, when information is recorded by using the (1, 7) RLL code as a recording code (it is now assumed that the shortest mark length is set to about 0.8 μm), the above-mentioned wording "is equal to or larger than a predetermined value" is set to "is equal to or larger than 0.4 μm" and the wording "is equal to or less than a predetermined value" is set to "is equal to or less than 1.6 μm".

In the mark position recording system, when information is recorded by using the (1, 7) RLL code as a recording code (it is now assumed that a shortest mark length is set to about 0.67 μm), the above-mentioned wording "is equal to or larger than a predetermined value" is set to "is equal to or less than 2.68 μm".

In the sampling servo recording system, when information is recorded by using the 4/11 code as a recording code, the above-mentioned wording "is equal to or larger than a predetermined value" is set to "is equal to or larger than 0.44 μm" and the wording "is equal to or less than a predetermined value" is set to "is equal to or less than 2.64 μm".

The details will now be described in embodiments hereinafter.

BRIEF DESCRIPTION OF THE DRAWINGS

FIGS. 5(a) through 5(g) are diagrams showing flows of signals in the reproducing means of a conventional magneto-optical reproducing apparatus;

FIG. 6 is a schematic diagram of reproducing means of a conventional magneto-optical reproducing apparatus according to a pit position recording;

FIG. 7 is a schematic diagram of the PLL means of the conventional magneto-optical reproducing apparatus according to the pit position recording;

FIGS. 8(a) through 8(g) are diagrams showing flows of signals in the reproducing means of the conventional magneto-optical reproducing apparatus according to the pit position recording;

FIGS. 22(a) through 22(f) are diagrams showing flows of signals in the reproducing means of the magneto-optical reproducing apparatus of the sampling servo system embodying the invention;

FIG. 23 is a schematic diagram of recording means of the magneto-optical recording and reproducing apparatus embodying the invention;

FIGS. 24(a) through 24(f) are diagrams showing flows of signals in the recording means shown in FIG. 23;

FIG. 25 is a diagram showing a construction of data recording means; and

FIGS. 26(a) through 26(d) are diagrams showing flows of signals in the data recording means in FIG. 25.

DETAILED DESCRIPTION OF THE PREFERRED EMBODIMENTS

Embodiments of the present invention will now be described in detail hereinafter.

[Embodiment 1]

Figure 1:
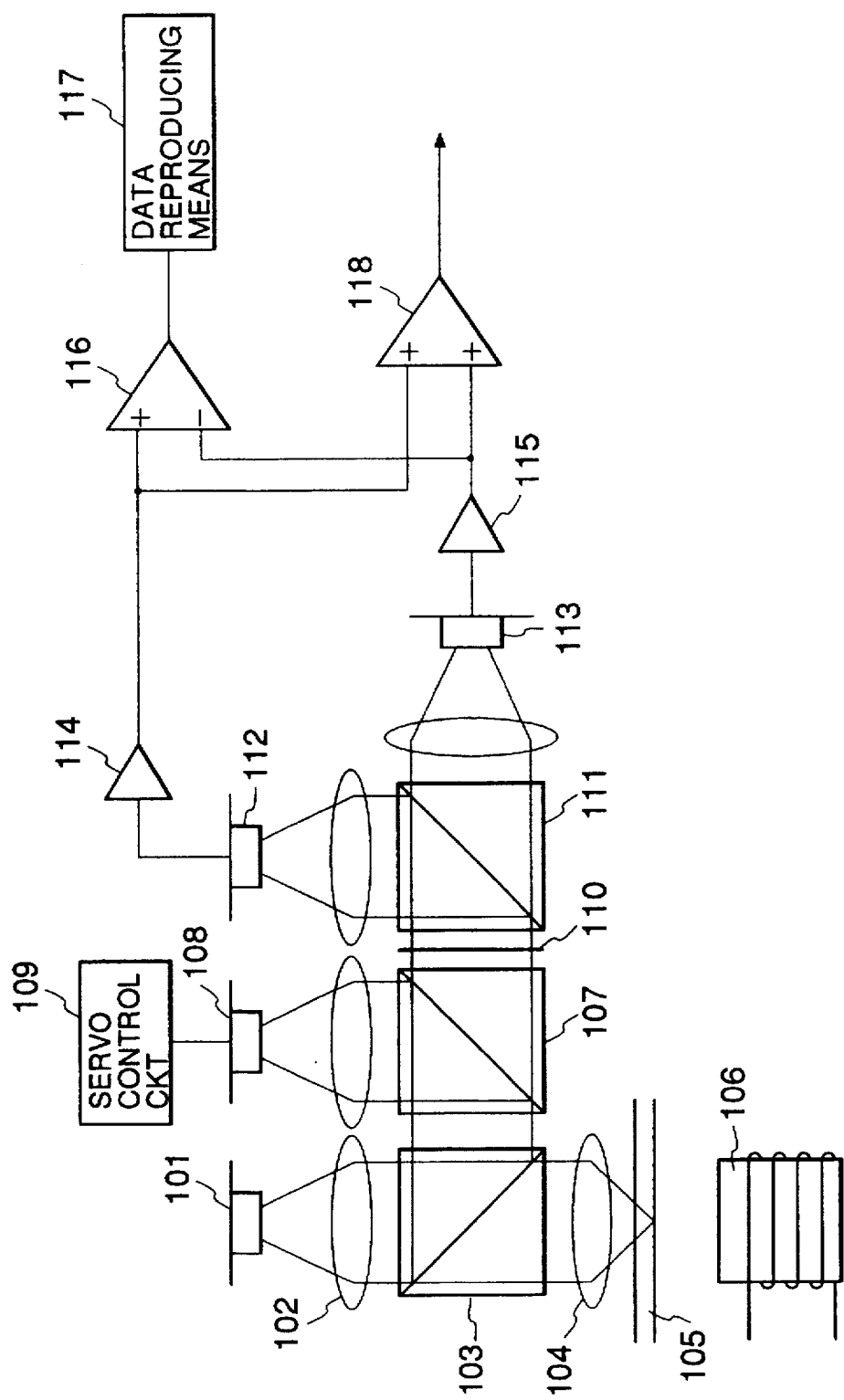
FIG. 1 is a schematic diagram of a conventional magneto-optical recording and reproducing apparatus.
Figure 2:
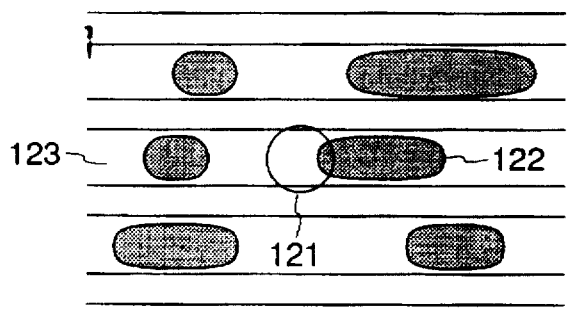
FIG. 2 is a schematic diagram of a recording medium surface using a conventional magneto-optical reproducing apparatus.
Figure 3:
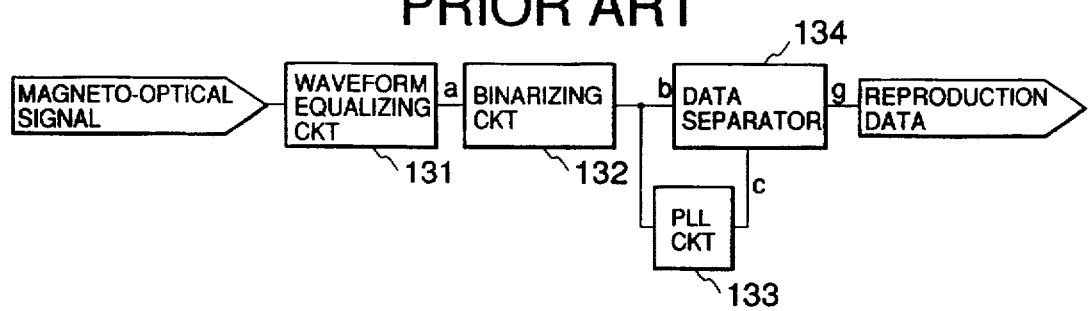
FIG. 3 is a schematic diagram of reproducing means of the conventional magneto-optical reproducing apparatus.
Figure 4:
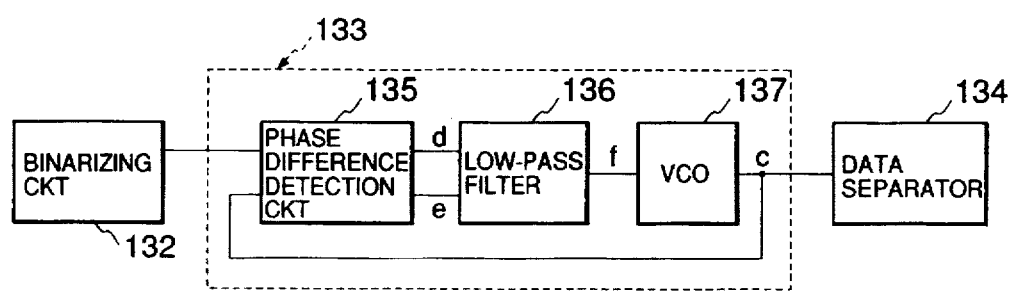
FIG. 4 is a schematic diagram of PLL means of the conventional magneto-optical reproducing apparatus.
Figure 9:
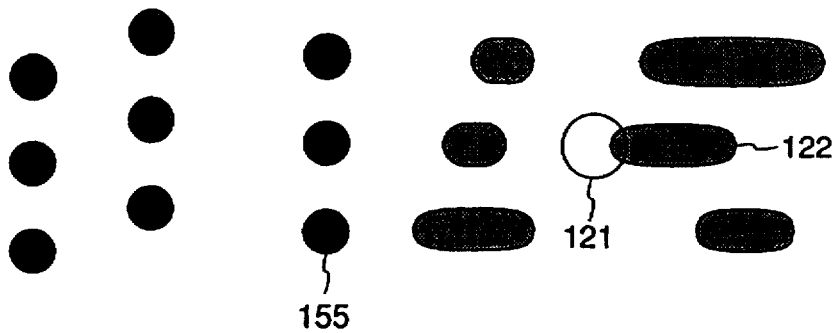
FIG. 9 is a schematic diagram on a recording medium surface using a conventional magneto-optical reproducing apparatus of a sampling servo system.
Figure 10:
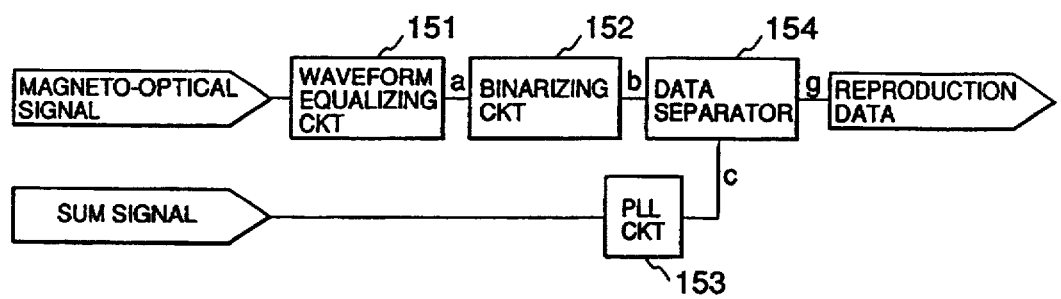
FIG. 10 is a schematic diagram of reproducing means of the conventional magneto-optical reproducing apparatus of the sampling servo system.
Figure 11A:
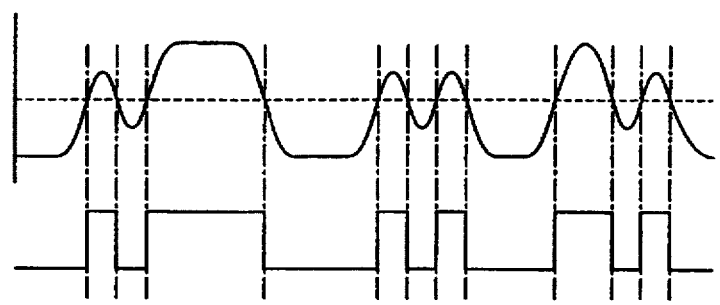
FIGS. 11(a) through 11(d) are diagrams showing flows of signals in the reproducing means of the conventional magneto-optical reproducing apparatus of the sampling servo system.
Figure 11B:
Figure 11C:
Figure 11D:
Figure 12:
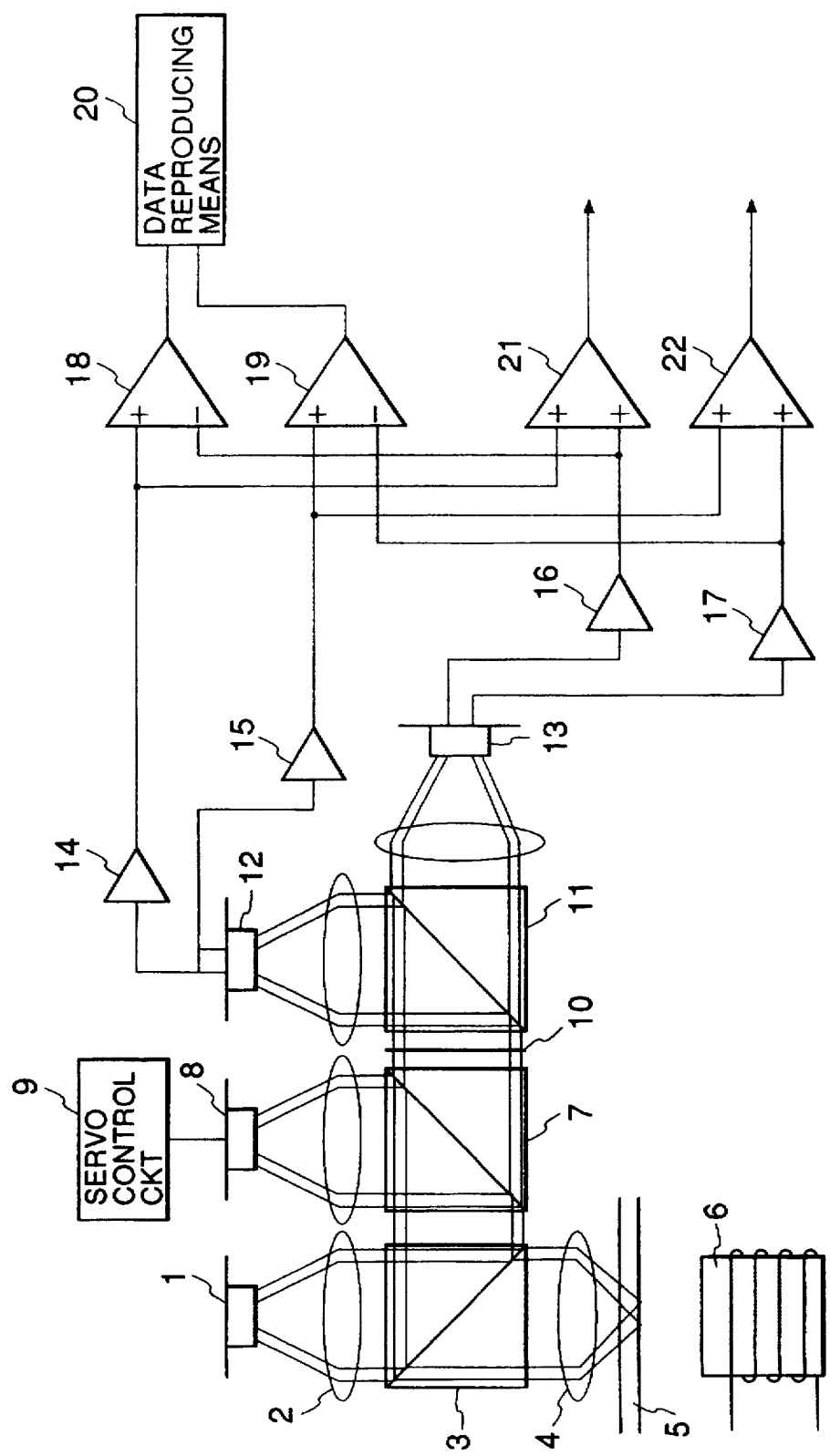
FIG. 12 is a schematic diagram of a magneto-optical recording and reproducing apparatus embodying the present invention.

An embodiment of the invention will now be described hereinafter with reference to the drawings. FIG. 12 shows a construction of a magneto-optical recording and reproducing apparatus embodying the invention.

Two laser beams emitted from a semiconductor laser array 1 are respectively converted into parallel light beams by a collimator lens 2 and are focused onto a recording medium 5 through a beam splitter 3 and an objective lens 4, thereby forming two beam spots.

Figure 13:
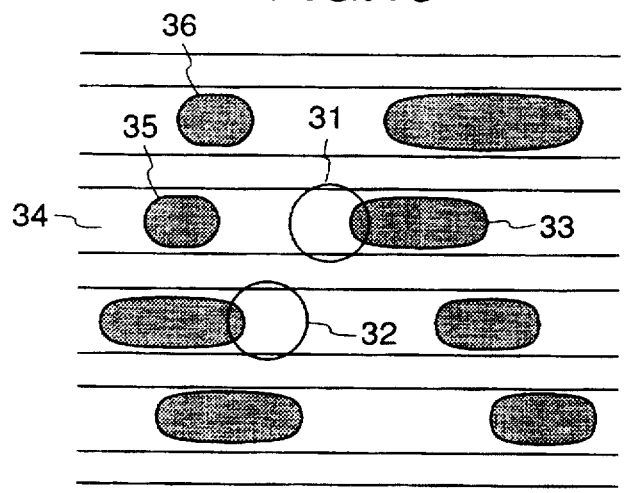
FIG. 13 is a schematic diagram on a recording medium surface of a magneto-optical reproducing apparatus embodying the invention.

FIG. 13 shows a portion of the recording medium near the beam spots. An information domain 33 is detected by two beam spots 31 and 32, thereby reproducing information. A process in this case will be explained hereinafter. The beam spots are positioned onto a land 34 between grooves formed previously on the recording medium by a focusing servo and a tracking servo by a servo control apparatus. The information domain 33 shown in the diagram shows an example of a mark edge recording in which recording signals are made to correspond to both ends of the information domain 33. It is well known that a recording density can be raised to a value that is about 1.5 times as high as a recording density by the mark position recording, which will be explained hereinafter. In each track in the diagram, the information domains 33 show three or more kinds of shapes and have multivalue information by differences among the lengths of the information domains 33 on each track. As a method of forming the two beam spots 31 and 32, for example, two semiconductor lasers in the semiconductor laser array 1 can be formed on the semiconductor chip or two semiconductor lasers also can be used. According to the invention, it is preferable that characteristics such as a laser wavelength and the like are matched. Each of information domains 35 and 36 indicates the shortest mark length and can be used as an information domain or a domain for synchronization. In the case of recording desired information, when the information is divided into two beam spots to be recorded, it is sufficient to record the information in consideration that the two beam spots are synthesized and reproduced. It is also sufficient to modulate a recording power of each semiconductor laser 1 under conditions such that information is reproduced using two tracks and that the track scanning operation is executed for every track.

A recording method of the invention will be further specifically explained.

FIG. 23 shows a construction of data recording means.

Recording data is first inputted to an encoding circuit 301 and is subjected to a predetermined encoding process. An output of the encoding circuit 301 is shown in FIG. 24(a). An output signal of the encoding circuit 301 is supplied to a leading edge detection circuit 302 and a trailing edge detection circuit 303, thereby obtaining a leading edge signal shown in FIG. 24(b) and a trailing edge signal shown in FIG. 24(c). Further, those signals are inputted to NRZI converting circuits 304 and 305 and are NRZI converted, thereby forming recording signals shown in FIGS. 24(e) and 24(f). The recording signals are supplied to semiconductor laser drive circuits 306 and 307. By independently modulating the two beam spots on the basis of the recording signals, the recording is performed.

Waveforms of reproduction signals are shown in FIGS. 24(d) and 24(g).

Although the above construction has been shown and described with respect to an example in which the recording is executed by using two beam spots, by providing the leading edge detection circuit, trailing edge detection circuit, and NRZI converting circuit at the post stage of each of the NRZI converting circuits 304 and 305, the recording using four beam spots also can be performed. In this case, however, the reproduction is also executed by using four beam spots.

Returning to FIG. 12, the construction will now be described. When recording information by the magneto-optical recording and reproducing apparatus, an output light amount of the laser is increased and a temperature of a portion on the recording medium where the laser spot is positioned is locally raised. By applying a recording magnetic field by a bias magnet 6, an information domain is formed, thereby recording information.

When information is reproduced, an output light amount of the laser beam emitted from the semiconductor laser array 1 of two beams is reduced, thereby preventing that a temperature of the portion on the recording medium 5 where the laser spot is positioned is largely raised. On the recording medium, the reflected light whose plane of polarization has been rotated by a Kerr effect in accordance with the recording information again reaches the beam splitter 3 through the objective lens 4. The reflected light is separated from the incident light by the beam splitter 3. A part of the light beam is guided toward a servo sensor 8 by a beam splitter 7. An output of the servo sensor 8 is inputted to a servo control circuit 9, so that the beam spot is positioned at a land on the recording medium 5. After the plane of polarization was rotated by a $\lambda/2$ half wave plate 10, the remaining light beam is separated by a beam splitter 11 and is received by RF sensors 12 and 13.

Each of the RF sensors 12 and 13 is divided into a plurality of photosensitive portions. The reflected lights corresponding to the two beam spots enter the exclusive-use photosensitive portions, respectively. Current outputs of the RF sensors 12 and 13 are converted into voltages by preamplifiers 14, 15, 16, and 17, respectively.

Differences between outputs of the preamplifiers 14 and 15 and outputs of the preamplifiers 16 and 17 are obtained by differential amplifiers 18 and 19, respectively, thereby obtaining magneto-optical signals from the two beams. The magneto-optical signals obtained are inputted to data reproducing means 20 and data is detected. The outputs of the preamplifiers 14 and 15 are inputted to adding amplifiers 21 and 22 and are added to the outputs from the preamplifiers 16 and 17, respectively, thereby obtaining sum signals of the two beams. The sum signals are used, for example, to form a sync signal.

Figure 14:
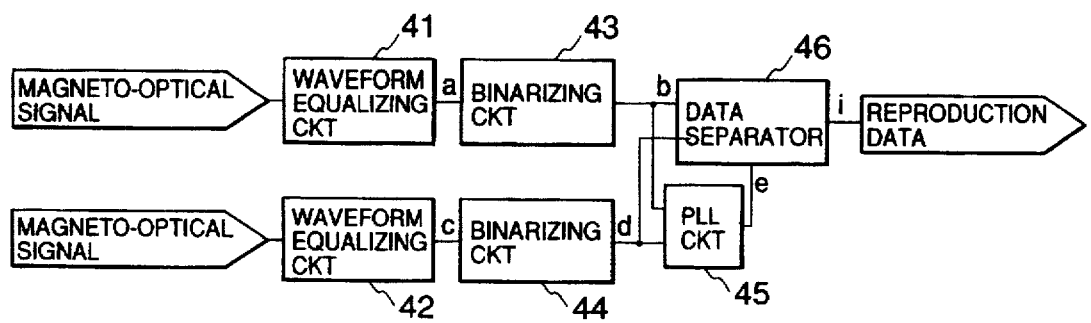
FIG. 14 is a schematic diagram of reproducing means of the magneto-optical reproducing apparatus embodying the invention.
Figure 16:
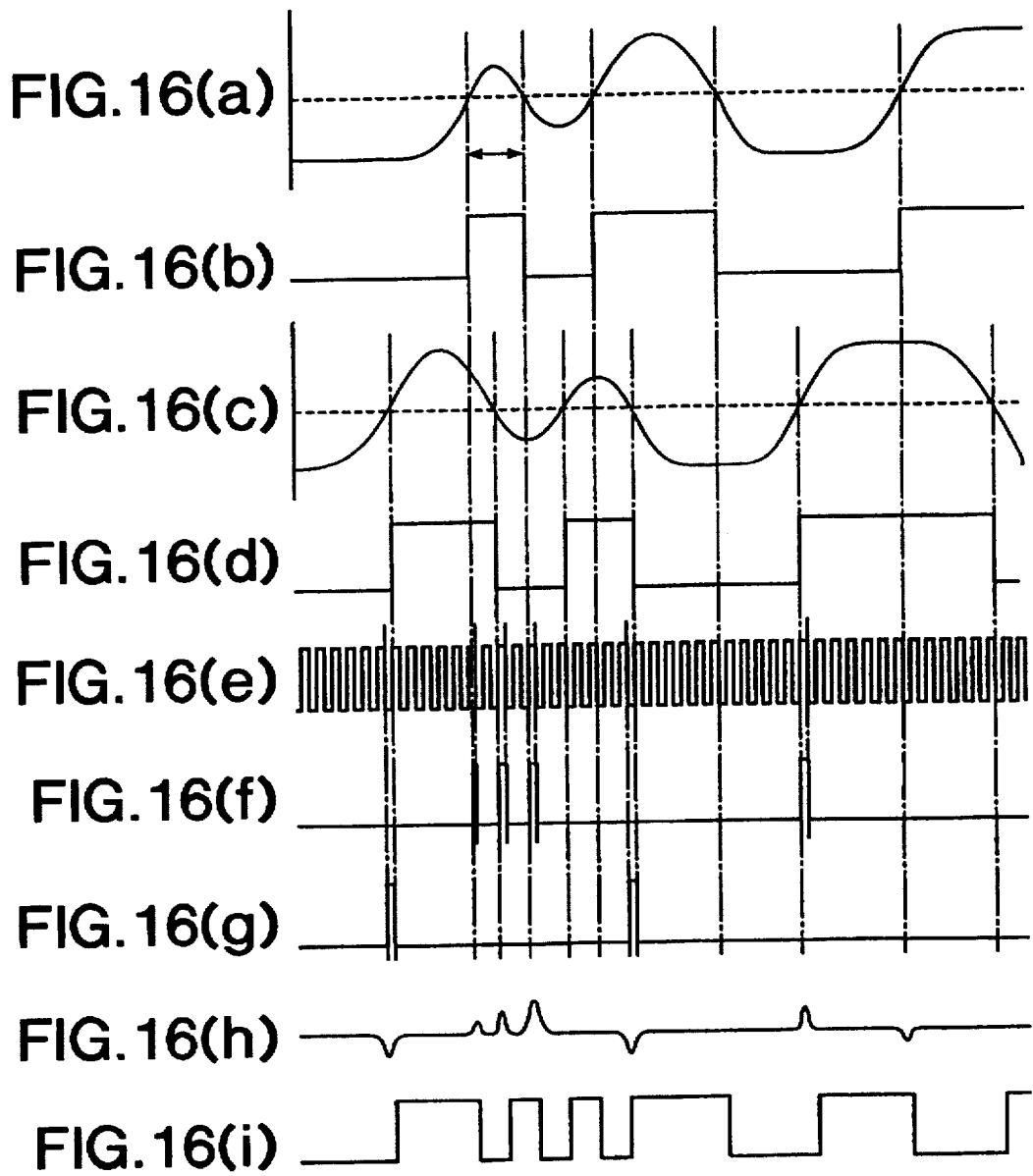
FIGS. 16(a) through 16(i) are diagrams showing flows of signals in the reproducing means of the magneto-optical reproducing apparatus embodying the invention.

FIG. 14 shows a construction of the data reproducing means 20. The two magneto-optical signals of the outputs of the differential amplifiers 18 and 19 are inputted to waveform equalizing circuits 41 and 42 and waveforms are shaped. Resultant outputs of the waveform equalizing circuits 41 and 42 are shown in FIGS. 16(a) and 16(c). By inputting those signals to binarizing circuits 43 and 44 and comparing those signals with predetermined slice levels, they are binarized and waveforms as shown in FIGS. 16(b) and 16(d) are derived. Those signals are supplied to a PLL circuit 45, thereby obtaining a clock as shown in FIG. 16(e). The clock signal is supplied to a data separator 46 as a logic circuit. By detecting data by the clock, reproduction data shown in FIG. 16(d) is derived.

Figure 15:
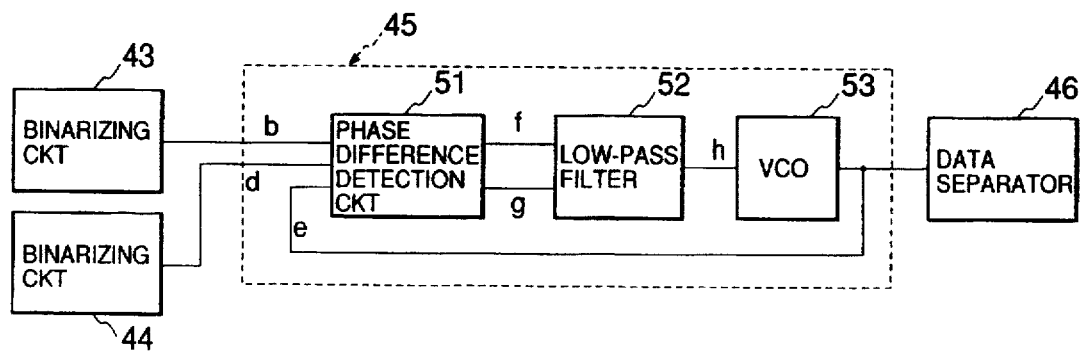
FIG. 15 is a schematic diagram of PLL means of the magneto-optical reproducing apparatus embodying the invention.

FIG. 15 shows a construction of the PLL circuit 45 in this instance. Deviations between phases of the output signals from the binarizing circuits 43 and 44 shown in FIGS. 16(b) and 16(d) and the clock shown in FIG. 16(e) are detected by a phase difference detection circuit 51, thereby obtaining a phase delay pulse signal shown in FIG. 16(f) and a phase advance pulse signal shown in FIG. 16(g). Those pulse signals are inputted to a low pass filter 52, thereby obtaining a voltage value corresponding to a deviation of the phase shown in FIG. 16(h). Such a voltage signal is inputted to a VCO (Voltage Controlled Oscillator) 53 and an oscillating frequency of a built-in voltage controlled oscillator is controlled, thereby obtaining a sync clock in FIG. 16(e). On the other hand, the sync clock shown in FIG. 16(e) is supplied to the data separator 46. For example, by getting the NAND of the two binary data while sampling each binary data, reproduction data recorded on the magneto-optical disk and shown in FIG. 16(i) is obtained.

In the example, the (1, 7) RLL (Run Length Limited) code is used as a recording code of the recording modulation system. There are the minimum inversion time (d) and the maximum inversion time (k) as parameters to decide the performance of the recording code.

In the construction, when using an optical system such that a laser wavelength is set to 780 nm and a numerical aperture NA of the objective lens is set to 0.55, a shortest mark length can be set to about 0.80 µm. In this case, a recording density of 0.30 µm/bit can be accomplished in the linear recording density direction. Now, assuming that a linear velocity of the disk is set to 15.0 m/sec in this instance, a transfer rate of 6.25 bytes/sec can be obtained. As compared with the mark edge recording system shown first as a conventional apparatus, it will be understood that even if the linear velocity of the recording medium is constant, a double transfer rate can be obtained. In this case, however, although the linear recording density is two times as high as the conventional one, since two tracks are used, the area recording density is constant and the recording capacity doesn't increase.

However, when the transfer rate is set to the same value of 3.13 bytes/sec as the conventional one, the linear velocity of the disk can be reduced to about 7.5 m/sec. In this instance, a frequency distribution of the reproduction signal is about half that shown in the conventional apparatus. Thus, the S/N ratio is improved, so that the recording density can be improved by raising the recording frequency, further reducing the number of revolutions of the disk, or the like.

From the above description, according to the invention, the transfer rate and the recording density can be improved.

In the embodiment, although the construction of the magneto-optical recording and reproducing apparatus has been described, it will be understood that similar effects are derived with regard to an optical reproducing apparatus such as a CD-ROM or the like, an optical disk recording and reproducing apparatus, or the like with a construction similar to the above construction.

As a recording method of the optical disk, there are two kinds of methods of the light modulation type and the magnetic modulation type as a magneto-optical disk. Reproducing methods of data in those types are common. There is also a phase change optical disk type for recording by changing a phase of a recording film by applying heat to the recording film. According to such a type, information is reproduced by detecting a difference between reflectances of the information domains. However, in any one of those types, by using two beam spots by two semiconductor lasers according to the invention, the transfer rate and the recording density can be improved.

[Embodiment 2]

An example in the case of embodying the invention by an apparatus for performing a pit position (mark position) recording will now be described. Since a construction other than data recording means and data reproducing means is almost similar to that mentioned above, only the data recording means and data reproducing means will be explained here.

FIG. 25 shows a construction of the data recording means.

Recording data is first inputted to an encoding circuit 311 and is subjected to a predetermined encoding process. An output of the encoding circuit 311 is shown in FIG. 26(a). The processed signal of the encoding circuit is supplied to an NRZI converting circuit 312 and is NRZI converted, thereby forming a signal shown in FIG. 26(b). Further, this signal is inputted to a leading edge detection circuit 313 and a trailing edge detection circuit 314, thereby obtaining a leading edge signal shown in FIG. 26(c) and a trailing edge signal shown in FIG. 26(d). Those signals are inputted as recording signals to semiconductor laser drive circuits 315 and 316 and two beam spots are independently modulated, thereby recording.

Although the above construction relates to the example using two beam spots, by providing the NRZI converting circuit, leading edge detection circuit, and trailing edge detection circuit at the post stage of each of the leading edge detection circuit 313 and trailing edge detection circuit 314, respectively, the recording using four beam spots also can be performed.

Figure 17:
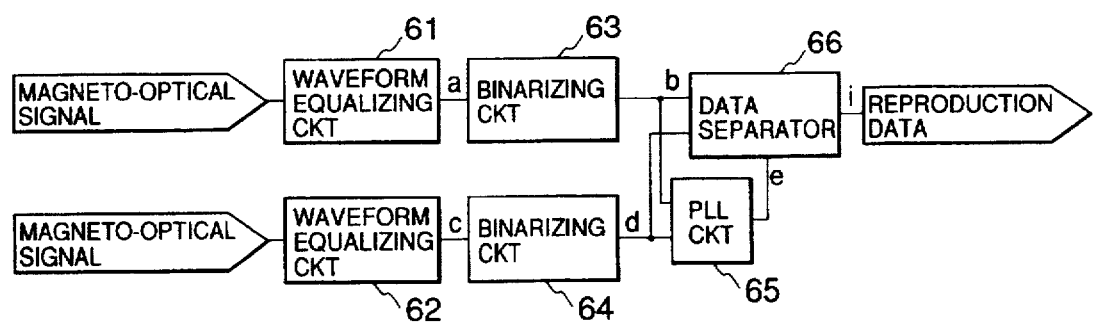
FIG. 17 is a schematic diagram of reproducing means of a magneto-optical reproducing apparatus according to pit position recording embodying the invention.
Figure 19:
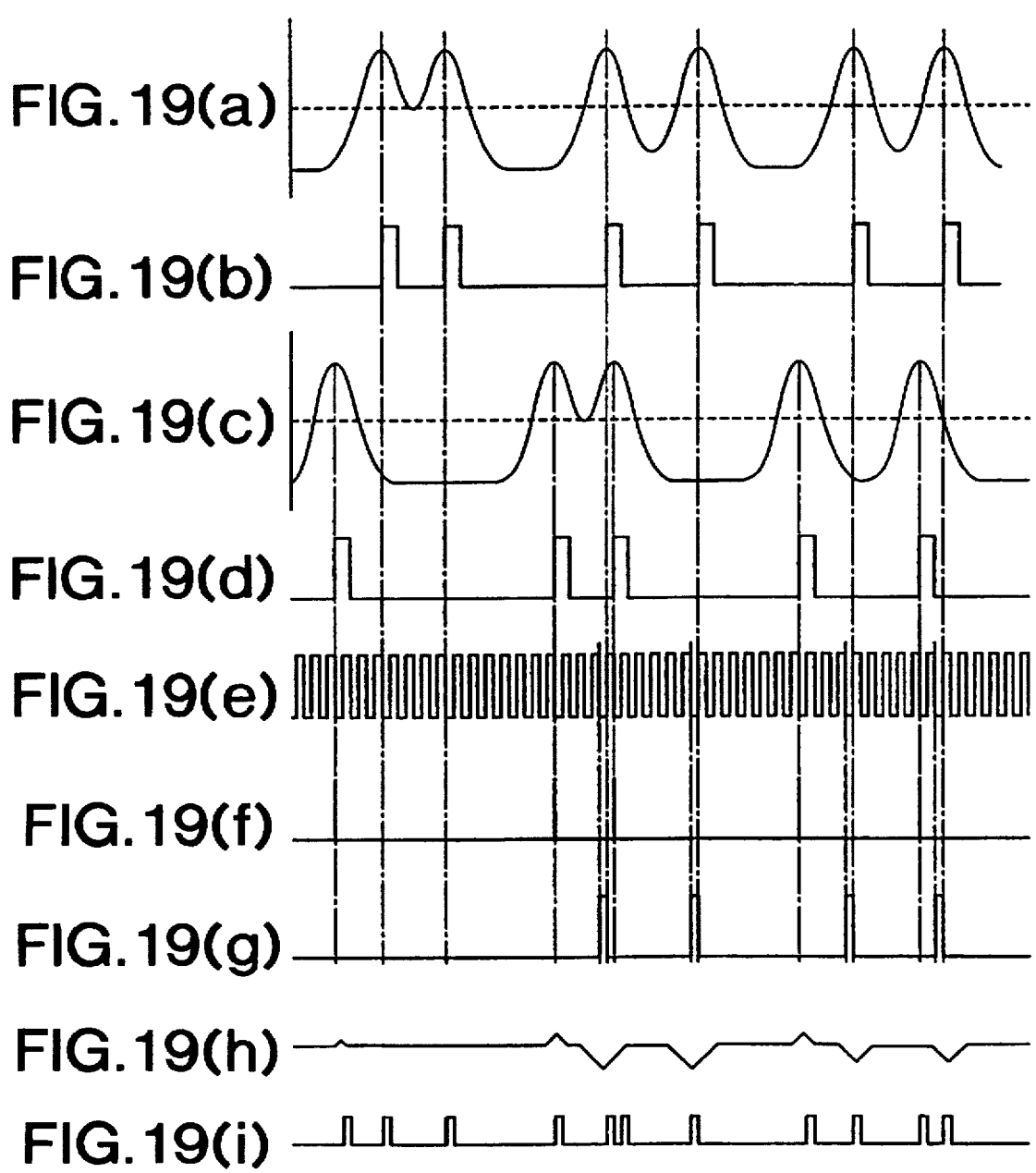
FIGS. 19(a) through 19(i) are diagrams showing flows of signals in the reproducing means of the magneto-optical reproducing apparatus according to the pit position recording embodying the invention.

FIG. 17 shows a construction of the data reproducing means. Two magneto-optical signals of the outputs of the differential amplifiers 18 and 19 are inputted to waveform equalizing circuits 61 and 62, thereby shaping waveforms. Resultant outputs are shown in FIGS. 19(a) and 19(c). Those output signals are inputted to binarizing circuits 63 and 64 and are compared with predetermined slice levels, thereby binarizing and obtaining waveforms as shown in FIGS. 19(b) and 19(d). The binary signals are inputted to a PLL circuit 65, thereby obtaining a clock as shown in FIG. 19(e). The clock is inputted to a data separator 66 and data is detected by the clock, thereby obtaining reproduction data shown in FIG. 19(i). Consequently, it will be understood that information domains of each track on the optical disk exist at points corresponding to the high level shown in FIGS. 19(b) and 19(d) and have been recorded.

Figure 18:
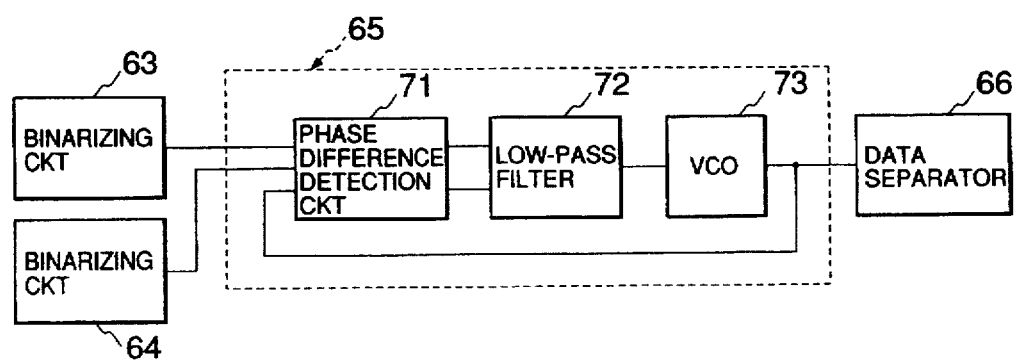
FIG. 18 is a schematic diagram of the PLL means of the magneto-optical reproducing apparatus according to the pit position recording embodying the invention.

FIG. 18 shows a construction of the PLL circuit in this instance. Deviations between the phases of the output signals from the binarizing circuit shown in FIGS. 19(b) and 19(d) and the clock shown in FIG. 19(e) are detected by a phase difference detection circuit 71, thereby obtaining a phase delay pulse signal shown in FIG. 19(f) and a phase advance pulse signal shown in FIG. 19(g). Those pulse signals are inputted to a low-pass filter 72, thereby obtaining a voltage value corresponding to a deviation of the phase shown in FIG. 19(h). Such a voltage signal is inputted to a VCO (Voltage Controlled Oscillator) 73 and an oscillating frequency is controlled, thereby obtaining a sync clock.

In the example, the (1, 7) RLL (Run Length Limited) code is used as a recording code of the recording modulation system. There are the minimum inversion time (d) and the maximum inversion time (k) as parameters to decide the performance of the recording code. Generally, those times d and k are changed and are decided so as to be adapted to the optical disk.

In the construction, when using an optical system in which the laser wavelength is set to 780 nm and the NA of the objective lens is set to 0.55, a shortest mark length can be set to about 0.67 μm. In this case, a recording density of 0.50 μm/bit can be accomplished. In this instance, now assuming that a disk linear velocity is set to 15.0 m/sec, a transfer rate of 3.75 bytes/sec can be obtained. As compared with the conventional example shown first, it will be understood that even if the linear velocity is constant, a double transfer rate can be obtained. In this case, although the linear recording density is two times as high as the conventional one, since two tracks are used, an area recording density is constant and the capacity doesn't increase.

However, when the transfer rate is set to the same value of 1.88 bytes/sec as the conventional one, the disk linear velocity can be reduced to about 7.5 m/sec. In this instance, a frequency distribution of the reproduction signal is reduced to about half that shown in the conventional apparatus, so that the S/N ratio is improved. The recording density, consequently, can be improved.

With the above construction, even for an apparatus for performing the pit position recording, the transfer rate and recording density can be improved according to the invention.

Although the construction about the magneto-optical recording and reproducing apparatus has been shown and described in the embodiment, it will be understood that a similar effect is obtained with respect to an optical reproducing apparatus such as a CD-ROM or the like, an optical disk recording and reproducing apparatus, or the like with a construction similar to the above construction.

[Embodiment 3]

An example in which the invention is embodied to an apparatus in which a self clocking is not taken is now shown. An example in which the invention is embodied to a magneto-optical recording and reproducing apparatus of a sampling servo system will now be described.

Figure 20:
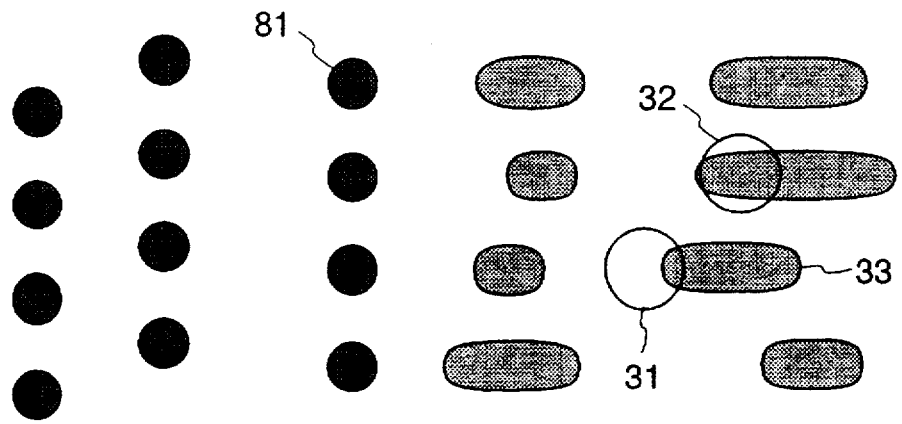
FIG. 20 is a schematic diagram on a recording medium surface using a magneto-optical reproducing apparatus of a sampling servo system embodying the invention.

The whole apparatus has a construction similar to that shown in FIG. 12. FIG. 20 shows a schematic diagram on the recording medium surface. In the diagram, portions similar to those in FIG. 13 are designated by the same reference numerals and their descriptions are omitted here. The information domain 33 is shown as an example of the mark edge recording system. A tracking servo and an extraction of a sync clock are executed by a reproduction signal from a mark 81 which has previously been recorded on the recording medium surface. In this instance, generally, a mark accompanied with a fluctuation of reflectance due to a recess, projection or the like on the recording medium surface is used as a mark which has previously been recorded. As such a reproduction signal, therefore, a sum signal which is obtained from the outputs of the adding amplifiers shown in FIG. 12 is used.

Figure 21:
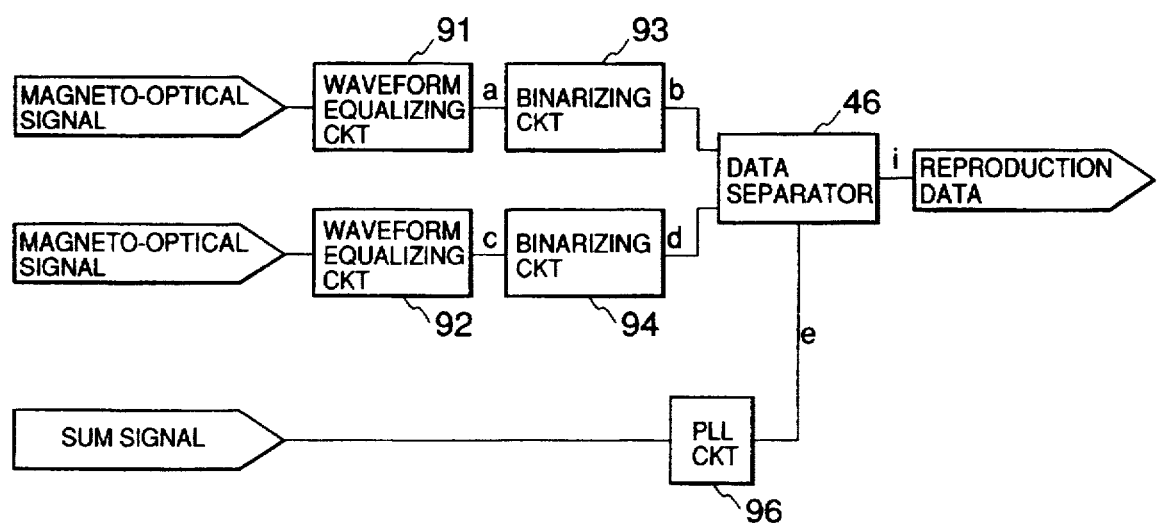
FIG. 21 is a schematic diagram of reproducing means of the magneto-optical reproducing apparatus of the sampling servo system embodying the invention.

FIG. 21 shows a construction of data reproducing means. A magneto-optical signal is inputted to waveform equalizing circuits 91 and 92, thereby shaping waveforms. Resultant outputs are shown in FIGS. 22(a) and 22(c). Those output signals are supplied to binarizing circuits 93 and 94 and compared with predetermined slice levels, thereby binarizing and obtaining waveforms as shown in FIGS. 22(b) and 22(d). Those waveform signals are inputted to a data separator 95 and data is detected by a sync clock extracted from a sum signal by a PLL circuit 96 and shown in FIG. 22(e), thereby obtaining reproduction data shown in FIG. 22(f).

In the above construction, when using an optical system in which a laser wavelength is equal to 780 nm and the NA of the objective lens is set to 0.55, a shortest mark length can be set to about 0.44 μm. In this case, when a 8/11 code (one byte is converted into 11 channel bits and recording pits are formed at a total of four positions of two odd number designated positions and two even number designated positions) is used as a code, a recording density of 0.30 μm/bit can be accomplished. In this instance, now assuming that a disk linear velocity is set to 15.0 m/sec, a transfer rate of 6.25 bytes/sec can be obtained. In this case, however, although a linear recording density is two times as high as a conventional one, since two tracks are used, an area recording density is constant and a recording capacity doesn't increase.

Now, assuming that the transfer rate is set to the same value of 3.13 bytes/sec as a conventional one, the disk linear velocity can be reduced to about 7.5 m/sec. In this instance, a frequency distribution of the reproduction signal is reduced to about half that shown in the conventional apparatus, so that the S/N ratio is improved. The recording density, therefore, can be improved.

With such a construction, even in the information recording and reproducing apparatus in which the clock is not extracted by the self clocking system, the transfer rate can be improved and the recording density can be improved by the invention.

In the embodiment, although the construction of the magneto-optical recording and reproducing apparatus has been described, it will be understood that a similar effect is obtained with regard to an optical reproducing apparatus such as a CD-ROM or the like, an optical disk recording and reproducing apparatus, or the like with a construction similar to that mentioned above.

In the above embodiment, although the example using two beam spots has been shown, the number of laser spots is not limited to two, but the recording and reproduction can be executed by irradiating two or more beam spots. With this method, by simultaneously reproducing the data of two or more tracks, the shortest mark length can be further reduced and the transfer rate can be improved. On the contrary, by reducing the disk linear velocity, the recording density also can be improved.

Although the above embodiment has been shown and mainly described with respect to the example having the waveform equalizing circuits, binarizing circuits, data separator, and PLL circuit as a reproducing method, the invention is not limited to such an example but many various modifications are possible. Even when information is recorded, so long as an information domain of the shortest mark length or longer can be individually formed, one time-sequential information can be detected by two or more beam spots, and the transfer rate and the high recording density can be improved.

What is claimed is:

1. An information reproducing apparatus for simultaneously reproducing information recorded on a recording medium through a plurality of information channels, said apparatus comprising:

generating means for generating a reproduction signal on the basis of an information mark detected from one of said information channels and an information mark subsequently detected from another information channel, wherein an interval between the detection of the information mark from the one information channel and the subsequent detection of the information mark from the other information channel is set to be within a range from a minimum inversion interval of a recording code to a maximum inversion interval of the recording code.

2. An apparatus according to claim 1, wherein said generating means includes:

a light source, a photodetective sensor, a waveform equalizing circuit, and a binarizing circuit provided in correspondence to each of said information channels; and a data separator for generating reproduction data on the basis of an output of each of said binarizing circuits and a clock signal.

3. An information reproducing method of simultaneously reproducing information recorded on a recording medium through a plurality of information channels, said method comprising:

generating a reproduction signal on the basis of an information mark detected from one of the information channels and an information mark subsequently detected from another information channel, wherein an interval between the detection of the information mark from the one information channel and the subsequent detection of the information mark from the other information channel is set to be within a range from a minimum inversion interval of a recording code to a maximum inversion interval of the recording code.

* * * * *